United States Patent [19]
Pritt

[11] Patent Number: 5,608,405
[45] Date of Patent: Mar. 4, 1997

[54] METHOD OF GENERATING VISUAL REPRESENTATION OF TERRAIN HEIGHT FROM SAR DATA EMPLOYING MULTIGRID ANALYSIS

[75] Inventor: Mark D. Pritt, Walkersville, Md.

[73] Assignee: Lockheed Martin Corporation, Bethesda, Md.

[21] Appl. No.: 539,928

[22] Filed: Oct. 6, 1995

[51] Int. Cl.$^6$ .................................................. G01S 13/90
[52] U.S. Cl. ............................................ 342/25; 342/191
[58] Field of Search ............................. 342/25, 190, 191

[56] References Cited

U.S. PATENT DOCUMENTS

| | | | |
|---|---|---|---|
| 4,037,048 | 7/1977 | Walker | 358/113 |
| 4,101,891 | 7/1978 | Jain et al. | 342/25 |
| 4,170,774 | 10/1979 | Schaefer | 342/94 |
| 4,551,724 | 11/1985 | Goldstein et al. | 342/25 |
| 4,951,136 | 8/1990 | Drescher et al. | 358/109 |
| 5,160,931 | 11/1992 | Brown | 342/25 |
| 5,170,171 | 12/1992 | Brown | 342/191 |
| 5,189,424 | 2/1993 | Brown | 342/25 |
| 5,260,780 | 11/1993 | Auterman | 342/25 |
| 5,424,743 | 6/1995 | Ghiglia et al. | 342/25 |

OTHER PUBLICATIONS

M. D. Pritt, "Algorithm for Two-Dimensional Phase Unwrapping Using Fast Fourier Transforms" IBM TDB vol. 37, No. 03, Mar. 1994, pp. 441–442.

Ghiglia, "Robust Two-Dimensional Weighted and Unweighted Phase Unwrapping That Uses Fast Transforms and Iterative Methods", Journal of Optical Society of America, vol. 11, No. 1, Jan. 1994, pp. 107–117.

Primary Examiner—Ian J. Lobo
Attorney, Agent, or Firm—Lane, Aitken, & McCann

[57] ABSTRACT

In a method of recovering data representing terrain height from a synthetic aperture radar system the phase data is unwrapped by a Gauss-Seidel relaxation technique applied to a least squares differential equation in a multigrid algorithm. In the multigrid algorithm the problem represented by the least squares equation is transferred to successively coarser grids to more quickly remove the low frequency components of error. The resulting interim solutions determined on the coarser grids are then transferred successively back to the finer grids to converge on the finest grid of the grid array.

13 Claims, 4 Drawing Sheets

METHOD OF GENERATING VISUAL REPRESENTATION OF TERRAIN HEIGHT FROM SAR DATA EMPLOYING MULTIGRID ANALYSIS

BACKGROUND OF THE INVENTION

This invention relates to a synthetic aperture radar system (SAR) for recovering data representing terrain height and generating an image thereof and, more particularly, to a system with improved capability of unwrapping the interference pattern provided by two co-registered SAR images. In an interferometric synthetic aperture radar system (IFSAR), complex-valued data representing two SAR images of the same terrain from slightly different angles are collected, processed and then registered, wherein the two images are spatially aligned. One component of the complex-valued data will be the phase of the received radar signals. The data representing the two images are combined pixel by pixel to generate an interference pattern from the images representing the pixel-wise phase differences of the registered images. The resulting phase difference data is proportional to the terrain height in modulo form wherein the modulus is the wavelength of the IFSAR system. In other words, the phase difference data of the combined image is the terrain height remainder after subtracting the multiple of the modulus from the amplitude of terrain height.

The unwrapping of the data representing the interference pattern is the conversion of this data into pixel data representing terrain height.

When there are no noise or aliasing effects in the phase data, phase unwrapping can be carried out by a simple and straight forward manner by a simple integration procedure in which the partial derivatives of the phase data are extracted and then integrated along vertical and horizontal lines. In practice, however, noise and aliasing effects are common in IFSAR data and if a simple integration is applied to IFSAR data corrupted by noise, the resulting data and image produced won't even approximate terrain height because the phase inconsistencies caused by the noise are propagated and accumulated in the integration procedure.

Prior to the present invention, phase unwrapping has been carried out by a least squares unwrapping technique. The least squares approach to phase unwrapping obtains an unwrapped solution by minimizing the differences between the discrete partial derivatives of the (wrapped) phase data and the discrete partial derivatives of the unwrapped solution. Given the wrapped phase $\Psi_{ij}$ defined on a rectangular grid defined by $0 \leq i \leq M$ and $0 \leq j \leq N$, an unwrapped solution $\phi_{ij}$ on the same grid is sought. The partial derivatives of the unwrapped phase data are defined to be the row and column differences $$\Delta^x_{ij} = \Psi_{ij} - \Psi_{i-1,j}, \quad \Delta^y_{ij} = \Psi_{ij} - \Psi_{i,j-1}. \tag{1}$$

These differences must be computed as wrapped phase differences, in which the value $2\pi$ is added or subtracted as necessary to ensure the differences lie in the interval $(-\pi,\pi]$. The differences are defined at the boundaries of the grid by means of the "boundary conditions"

$$\Delta^x_{0j} = -\Delta^x_{1j}, \ \Delta^y_{i0} = -\Delta^y_{i1}, \ \Delta^x_{M+1,j} = -\Delta^x_{Mj}, \ \Delta^y_{i,N+1} = -\Delta^y_{iN}. \tag{2}$$

The boundary conditions are essential for guaranteeing a unique solution to the partial differential equation which is derived as Eq. (4) below.

The differences between the partial derivatives of the solution $\phi_{ij}$ and the partial derivatives defined by Eq. (2) must be minimized. Differentiating the sum $$\Sigma_{i,j}(\phi_{ij} - \phi_{i-1,j} - \Delta^x_{ij})^2 + \Sigma_{i,j}(\phi_{ij} - \phi_{i,j-1} - \Delta^y_{ij})^2 \tag{3}$$

with respect to $\phi_{ij}$ and setting the result equal to zero yields the equation $$(\phi_{i+1,j} - 2\phi_{ij} + \phi_{i-1,j}) + (\phi_{i,j+1} - 2\phi_{ij} + \phi_{i,j-1}) = \rho_{ij}, \tag{4}$$

where the function $\rho_{ij}$ is defined by $$\rho_{ij} = \Delta^x_{i+1,j} - \Delta^x_{ij} + \Delta^y_{i,j+1} - \Delta^y_{ij}. \tag{5}$$

The values of the solution array $\rho_{ij}$ at the boundaries are defined by the boundary conditions $$\phi_{-1,j} = \phi_{1,j}, \ \phi_{i,-1} = \phi_{i1}, \ \phi_{M+1,j} = \phi_{M-1,j}, \ \phi_{i,N+1} = \phi_{i,N-1}. \tag{6}$$

The classical method for solving Eq. (4) is called Gauss-Seidel relaxation. In this method, one initializes the solution array $\rho_{ij}$ to zero and then performs the following updates in an iterative fashion:

$$\phi_{ij} = [\phi_{i+1,j} + \phi_{i-1,j} + \phi_{i,j+1} \phi_{i,j-1}) - \rho_{ij}]/4. \tag{7}$$

In the iteration, each value of $\phi_{ij}$ in the grid is computed in sequence using the current neighboring values of $\phi_{ij}$ and the known value of $\rho_{ij}$ computed from the phase data and the process is repeated until convergence occurs. The Gauss-Seidel relaxation is not a practical method of solving Eq. (4) because of its extremely slow convergence.

Due to its particular form, Eq. (4) can be solved directly (i.e., noniteratively) by means of Fourier techniques rather than Gauss-Seidel relaxation. After an appropriate "mirror reflection" operation, the FFT of the array $\rho_{ij}$ can be computed, the result divided by an appropriate function of cosines, and the inverse FFT of the result computed to yield the unwrapped solution. Alternatively, discrete cosine transforms can be used more efficiently in place of the FFT's since no mirror reflection is required.

A primary disadvantage of least squares phase unwrapping is that it unwraps through the phase inconsistencies rather than around them. This disadvantage can be remedied with the introduction of weighting values. When certain phase values are known to be corrupt due to noise, aliasing or other degradations, the corrupted phase values should be zero-weighted so they do not affect the unwrapping. In practice, there is provided an array of weighting values $0 \leq w_{ij} \leq 1$ that correspond to the given phase data. The least squares problem then becomes a weighted least squares problem, and the quantity to be minimized becomes $$\Sigma_{i,j} w^x_{ij}(\phi_{ij} - \phi_{i-1,j} - \Delta^x_{ij})^2 + \Sigma_{i,j} w^y_{ij}(\phi_{ij} - \phi_{i,j-1} - \Delta^y_{ij})^2 \tag{8}$$

where $w^x_{ij}$ and $w^y_{ij}$ are defined by $$w^x_{ij} = \min(w_{ij}^2, w_{i-1,j}^2) \ w^y_{ij} = \min(w_{ij}^2, w_{i,j-1}^2). \tag{9}$$

The least squares solution $\phi_{ij}$ to this problem is defined by the equation $$w^x_{i+1,j}(\phi_{i+1,j} - \phi_{ij}) - w^x_{ij}(\phi_{ij} - \phi_{i-1,j}) + w^y_{i,j+1}(\phi_{i,j-1} - \phi_{ij}) - w^y_{ij}(\phi_{ij} - \phi_{i,j-1}) = \hat{\rho}_{ij}, \tag{10}$$

where $\hat{\rho}_{ij}$ is defined by $$\hat{\rho}_{ij} = w^x_{i+1,j}\Delta^x_{i+1,j} + w^y_{i,j+1}\Delta^y_{i,j+1} - w^x_{ij}\Delta^x_{ij} - w^y_{ij}\Delta^y_{ij}. \tag{11}$$

Equation (10), unlike the unweighted least squares equation (4), cannot be solved directly. It must be solved iteratively.

The classical Gauss-Seidel relaxation method solves this equation by iterating on the following equation:

$$\phi_{i,j}=(w^x_{i+1,j}\phi_{i+1,j}+w^x_{i,j}\phi_{i-1,j}+w^y_{i,j+1}\phi_{i,j+1}+w^y_{i,j}\phi_{i,j-1}-\hat{\rho}_{i,j})/v_{i,j}, \quad (12)$$

where $v_{ij}$ is defined by $$v_{i,j}=w^x_{i+1,j}+w^x_{i,j}+w^y_{i,j+1}+w^y_{i,j}. \quad (13)$$

As in the unweighted case, the Gauss-Seidel method converges too slowly to be of practical use.

In an article entitled "Robust Two-Dimensional Weighted and Unweighted Phase Unwrapping that Uses Fast Transforms and Iterative Methods" by D. C. Ghiglia and L. A. Romero in the *Journal of Optical Society of America*, Vol. 11, No. 1, pp. 107–117, there is described a Preconditioned Conjugate Gradient method for solving the weighted least squares phase unwrapping problem. This method is an iterative technique that solves the weighted least squares unwrapping problem defined by equation (10) and speeds up the convergence of the algorithm.

SUMMARY OF THE INVENTION

The present invention employs a multigrid technique for rapidly solving partial differential equations represented on large grids. The methods of the invention are based on the concept of applying the Gauss-Seidel relaxation schemes on coarser, smaller grids.

The Gauss-Seidel relaxation technique of solving the differential equation is essentially a local smoothing operator that removes the high frequency components of error very quickly, but removes the low frequency components of error excruciatingly slowly. The idea of the multigrid approach is to transform the low frequency components of error to high frequency components which can be removed quickly by Gauss-Seidel relaxation. The lower sampling rate of a coarser grid increases the spatial frequencies of the residual error and thus enables the Gauss-Seidel relaxation technique to remove the error much more quickly. The multigrid solution is applicable to both the unweighted least squares phase unwrapping as well as the weighted least squares phase unwrapping.

DESCRIPTION OF A PREFERRED EMBODIMENT

Figure 1:
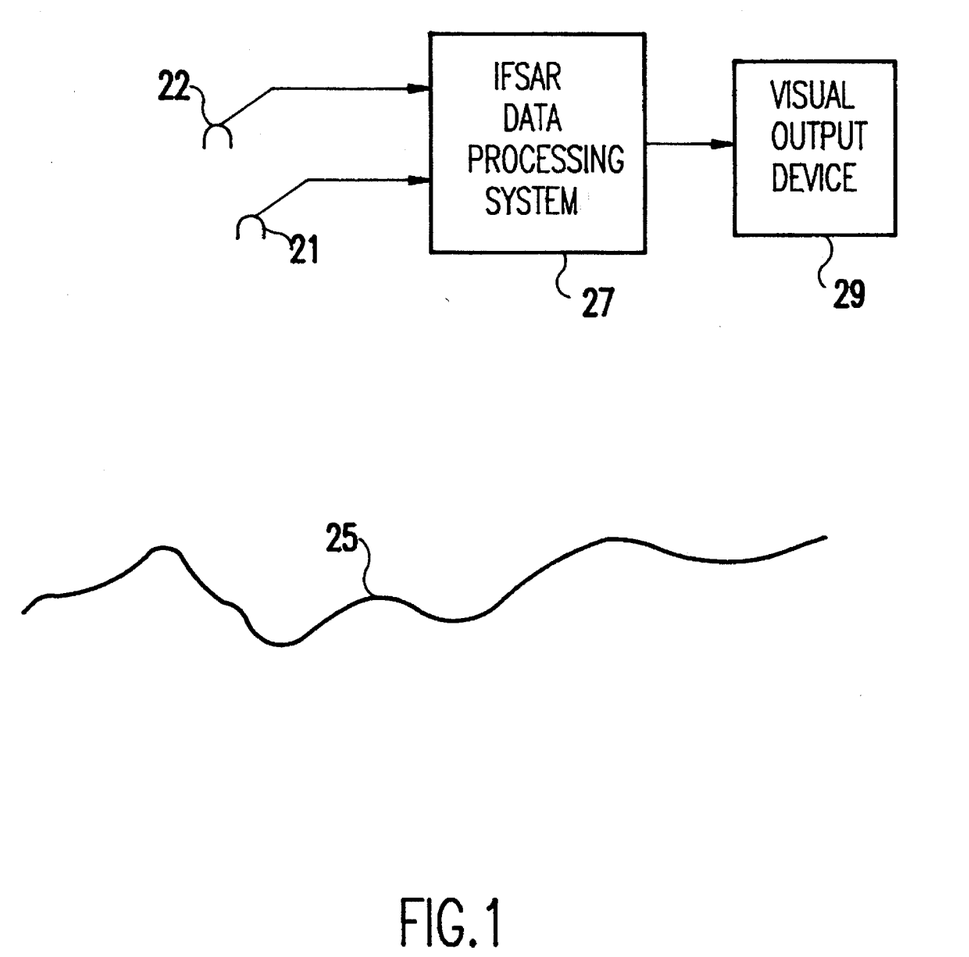
FIG. 1 illustrates the system of the invention.
Figure 2:
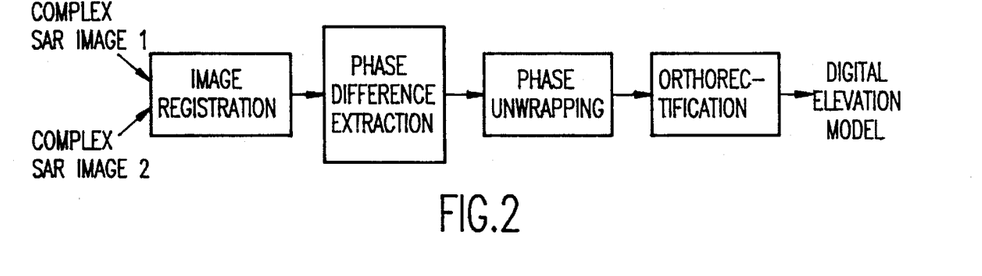
FIG. 2 is a flow chart of the operation of the data processor of the system of the invention.
Figure 3:
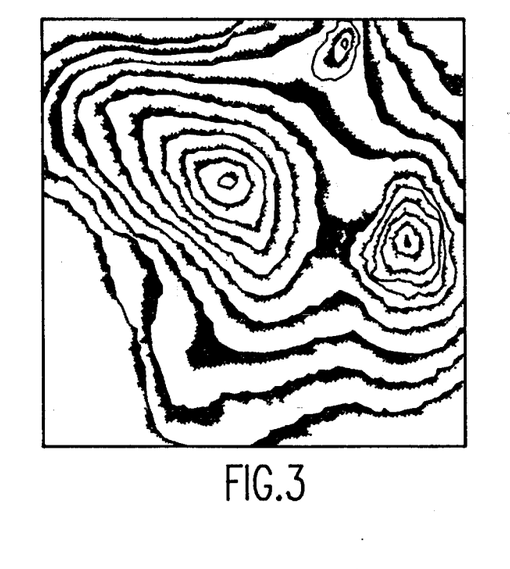
FIG. 3 illustrates what the wrapped phase data looks like when reproduced visually.

As shown in FIG. 1, the IFSAR system of the present invention comprises two SAR antennas 21 and 22 which are separated by a small known distance along an axis at a known angle from vertical. One of the antennas transmits a frequency modulated radar pulse towards the surface 25, of which it is desired to obtain a digital elevation model used to generate a visual representation of the surface. Pulses from the surface 25 are reflected back to the receivers 21 and 22 and the reflected signals received at the two antennas are applied to the IFSAR data processing system 27, which converts the received radar signals to a pixel based digital elevation model, in which digital signals represent the elevation of the different increments of the surface 25. The digital signals representing elevation of the surface 25 are applied to visual output device 29, which generates a visual representation of the surface 25, such as a contour map or a perspective image of the three dimensional surface. As shown in FIG. 2, the signals received by each of the two radar signals are first converted into complex valued SAR images as described in the Goldstein U.S. Pat. No. 4,551,724, issued November, 1985. These two images of the surface 25 will each be from slightly different angles. The data processing system 25 then registers the two images in spatial alignment with one another so that each pixel of the image from the antenna 21 will represent the same point or surface increment of the surface 25 that the corresponding pixel in the image from the antenna 22 represents. Following this image registration process, the data processing system 25 then extracts the phase difference between the two images pixel by pixel. The phase differences will be the difference in phase between the frequency of the received signal from each surface increment. The phase differences represent the terrain elevation of each increment of the surface 15 in modulo form in which the modulus is the wavelength. An example of what such pixel data would be like visually is shown in FIG. 3. Following the extraction of the phase difference data pixel by pixel, the phase data is unwrapped wherein the data is converted pixel by pixel to pixel values representing surface elevation. At this point, assuming that the surface 25 is a terrain below an aircraft or a satellite, the elevation data will be at an angle skewed from vertical. To convert the skewed elevation data into data representing terrain height, the data undergoes orthorectification whereupon the pixel data will be a digital elevation model of the surface and can be used to generate a visual image representing the surface.

The present invention is an improvement of the phase unwrapping portion of the above-described system and greatly reduces the number of Gauss-Seidel relaxation iterations which must be carried out to achieve the phase unwrapping modular data into an unwrapped terrain model of the surface 25. It also achieves the solution much faster than the Preconditioned Conjugate Gradient method mentioned above.

When the Gauss-Seidel relaxation scheme is used to directly solve equation (4), as described above, and unwrap the phase difference data into elevation data, the high frequency components of surface variation are very quickly extracted, but the low frequency components of surface variation are extracted very slowly. The reason for this phenomenon is that at each iteration of the Gauss-Seidel relaxation, each point of the pixel grid receives information only from its immediate neighbors. As a result, for a relatively small 200×200 grid, it would take over 30,000 iterations of the Gauss-Seidel relaxation to converge the data to within an RMS error of one percent of the solution. The Gauss-Seidel relaxation is essentially a local smoothing operator that removes high frequency components of error very quickly, but the lower frequency components of error are removed excruciatingly slowly. Because of this disadvantage, the Gauss-Seidel relaxation is entirely impractical for large grid sizes of 2K×2K.

Figure 4:
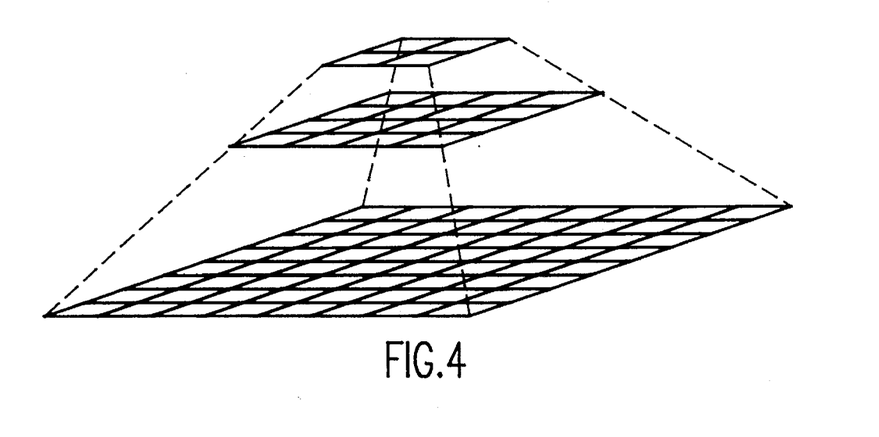
FIG. 4 illustrates a pyramid of grids used in the multigrid algorithm of the present invention.

In accordance with the present invention, to reduce the number of Gauss-Seidel iterations to reach a solution, a multigrid approach is employed. In the multigrid approach, the low frequency components of error are transformed into high frequency components which can be quickly removed by Gauss-Seidel relaxation. This transformation of low frequency components of error to high frequency components of error is accomplished by transferring the problem to coarser grids. The lower sampling rate of a coarser grid increases the spatial frequency of the residual error. For example, with a pyramid of grids with each grid half the resolution of its predecessor as shown in FIG. 4, the low spatial frequencies of error on the fine grid will propagate up to increasingly higher frequency on the coarse grids. In other words, the global information on the fine grid will become local information on the coarse grid. The strategy of the multigrid technique of the present invention is to transfer the problem to coarser grids where the Gauss-Seidel relaxation is applied and then transfer the resulting intermediate solution back to the fine grid. The intermediate solution will be dominated by high frequency components, the low frequencies having been removed by the Gauss-Seidel relaxation on the coarser grids, and then becomes the initial guess of Gauss-Seidel relaxation on the fine grid. The operation of transferring the problem to a coarser grid is accomplished by means of a "restriction operator," which is the mathematical formula by which the data in the coarser grid is calculated from the data in the fine grid. The operation of transferring the solution to a finer grid is called the "prolongation operator." An obvious restriction operator is the "injection operator" which simply transfers every other point from the fine grid to the coarse grid. An alterative and preferred restriction operator and one that gives better results in practice is called "full weighting" and is defined by $$c_{ij} = \frac{1}{16} (f_{2i-1,2j-1} + f_{2i+1,2j-1} + f_{2i-1,2j+1} + f_{2i+1,2j+1}) + \frac{1}{8} (f_{2i,2j-1} + f_{2i,2j+1} + f_{2i-1,2j} + f_{2i+1,2j}) + \frac{1}{4} f_{2i,2j}. \quad (14)$$

In this formula, $c_{ij}$ is the value of a pixel on the coarse grid at the intersection of row i and row j and $f_{ij}$ is the value on the fine grid at the intersection of column i and row j.

The full weighting operator essentially smooths the fine grid with the filter template $$\begin{bmatrix} \frac{1}{16} & \frac{1}{8} & \frac{1}{16} \\ \frac{1}{8} & \frac{1}{4} & \frac{1}{8} \\ \frac{1}{16} & \frac{1}{8} & \frac{1}{16} \end{bmatrix} \quad (15)$$

and then resamples every other point.

The prolongation operator is usually the bilinear interpolation operator defined by $$f_{2i,2j} = c_{ij} \quad (16)$$

$$f_{2i+1,2j} = \frac{1}{2} (c_{ij} + c_{i+1,j})$$

$$f_{2i,2j+1} = \frac{1}{2} (c_{ij} + c_{i,j+1})$$

$$f_{2i+1,2j+1} = \frac{1}{4} (c_{ij} + c_{i+1,j} + c_{i,j+1} + c_{i+1,j+1})$$

In multigrid, the prolongation operator is used to transfer the intermediate solutions obtained on the coarser grids to the finer grids, while the restriction operator is used to transfer the "residual error" of the equation to be solved to the coarser grids. Relaxation is performed on the residual error, which is equivalent to relaxing on the equation itself. This can be seen as follows. Expressing the equation to be solved as the linear problem $$Ae = \rho - A\hat{\phi}, \quad (17)$$

where $\hat{\phi}$ is an approximation to the exact solution $\phi$ and e is the error $\phi - \hat{\phi}$. Relaxation on the equation $A\phi = \rho$ with the initial guess $\hat{\phi}$ is thus equivalent to relaxing on the residual equation $Ae = r$ with the initial guess $e = 0$, where r is the residual error $r = \rho - A\hat{\phi}$. In practice, the approximation $\hat{\phi}$ is the intermediate solution obtained by Gauss-Seidel relaxation on one grid, and the initial guess $e = 0$ is the starting point for the Gauss-Seidel relaxation on the next grid.

A multigrid algorithm for solving the linear problem $A\phi = \rho$ will now be described. For reasons that will soon be apparent, this particular algorithm is called a V-cycle scheme. The following notation will be needed. Let $\phi_N$ and $\rho_N$ denote the vectors $\phi$ and $\rho$ defined on an N×N grid. For simplicity, it will be assumed the grids are square, although the algorithm works for rectangular grids as well. It is assumed that the operator A can be defined for any grid size. Let R and P denote the restriction and prolongation operators, respectively. Finally, let MV denote the name of the V-cycle routine, since it calls itself recursively. The MV algorithm accepts three parameters: the two vectors $\phi$ and $\rho$ and the grid dimension N. The multigrid V-cycle algorithm is represented by the following expression $\phi_N \leftarrow MV(\phi_N, \rho_N)$ and is carried out by the following sequential steps:

1. Relax $v_1$ times on the equation $A\phi_N = \rho_N$ with the given initial guess $\phi_N$.
2. If N×N is the coarsest grid, then go to Step 7.
3. $\rho_{N/2} \leftarrow R(\rho_N - A\phi_N)$
4. $\phi_{N/2} \leftarrow 0$
5. $\phi_{N/2} \leftarrow MV(\phi_{N/2}, \rho_{N/2})$
6. $\phi_N \leftarrow \phi_N + P(\phi_{N/2})$
7. Relax $v_2$ times on the equation $A\phi_N = \rho_N$ with the initial guess $\phi_N$.

In Step 3, the restriction operator transfers the residual error $\rho - A\phi$ to the next coarser grid on which the residual error is identified as $\rho_{N/2}$. In step 4, the solution $\phi_{N/2}$, on the next coarser grid is set to zero. Step 5 calls the V-cycle routine recursively to solve the residual equation on the coarser grid. Accordingly, Steps 1–4 will be repeated sequentially for each successively coarser grid until the coarsest grid is reached wherein only Steps 1, 2 and 7 will be performed for the coarsest grid in the recursive operation of Step 5. Following, Step 7 on the coarsest grid as part of Step 5, the algorithm will perform Steps 6 and 7 on the grid next to the coarsest grid and then repeat Steps 6 and 7 on sequentially finer grids until the finest grid is reached and after carrying out Steps 6 and 7 on the finest grid, the program will be completed. In Step 6, the prolongation operator transfers the solution of the residual equation from a given grid to the next finer grid and adds it to the current solution on the next finer grid. In the last iteration through Steps 6 and 7, the prolongation operator will be transferring the solution of the residual equation from the next to finest grid to the finest grid. The number of Gauss-Seidel relaxation sweeps specified by $v_1$ and $v_2$ in Steps 1 and 7 is typically only one or two.

Thus, the operation of the multigrid V-cycle algorithm proceeds as follows. It performs Gauss-Seidel relaxation sweeps on the finest grid and restricts the residual of the intermediate solution to the next coarser grid. It repeats this process with the coarse grid in place of the fine grid until it reaches the coarsest grid, whose size is very small (typically 3×3). It then works its way back up to the finest grid by a repetitive process of prolongation of the intermediate solutions and relaxation on each grid.

Figure 5A:
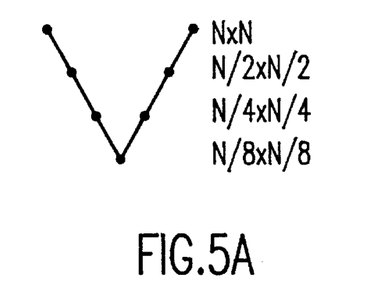
FIG. 5a illustrates the sequence in which the grids are visited in the V-cycle algorithm used in the multigrid algorithm.

In this manner, the multigrid V-cycle algorithm telescopes down to the coarsest grid and then works its way back up the finest grid. The schedule for the grids in the order in which they are visited is shown pictorially in FIG. 5a. In this Figure the finest grid is represented by its size N×N and the coarsest grid is represented by its size N/8×N/8. The complete process is called a V cycle.

Figure 5B:
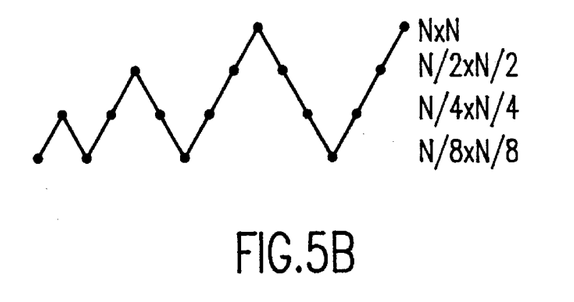
FIG. 5b illustrates the sequence in which the grids are visited in the full multigrid algorithm.
Figure 6:
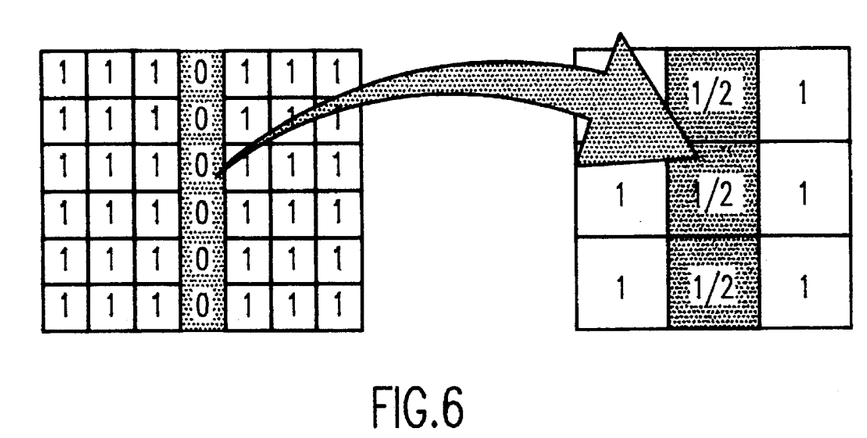
FIG. 6 illustrates how the "full weighting" operation used in the system of the invention would not preserve zero lines of weight.

The so-called full multigrid (FMG) algorithm takes the V-cycle algorithm a step further by visiting the grids according to the schedule shown in FIG. 5b. A complete cycle through this schedule is called an FMG cycle. The FMG algorithm generally has better convergence properties than the V-cycle algorithm. The algorithm for one FMG cycle, represented by the expression $\phi_N \leftarrow \text{FMG}(\phi_{N,\rho_N})$, is given below. For n FMG cycles, the algorithm is called n times. Note that the FMG algorithm calls the multigrid V-cycle algorithm in Step 6 below.

1. If N×N is the coarsest grid, then go to Step 6.
2. $\rho_{N/2} \leftarrow R(\rho_N - A\phi_N)$
3. $\phi_{N/2} \leftarrow 0$
4. $\phi_{N/2} \leftarrow \text{FMG}(\phi_{N/2}, \rho_{N/2})$
5. $\phi_N \leftarrow \phi_N + P(\phi_{N/2})$
6. $\phi_N \leftarrow \text{MV}(\phi_N, \rho_N)$ Step 4 calls the full multigrid routine recursively to solve the residual equation on the next coarser grid. Accordingly, Steps 1–3 will be repeated sequentially for each successively coatset grid until the coarsest grid is reached whereupon Steps 1 and 6 are performed on the coarsest grid. Thereafter, Steps 5 and 6 will be performed sequentially for each successive finer grid starting with the next to coarsest grid and then proceeding until the finest grid is reached.

In Step 6, the V-cycle or MV algorithm is called for as described above. As a result, the sequencing between the grids will be as shown in FIG. 5b. The size of the grids is represented in this Figure in the same way as in FIG. 5a. Steps 1–4 of the FMG algorithm proceed from the finest grid down to the coarsest grid and then when Step 6 is reached after Step 1 on the coarsest grid, Step 1 and Step 7 of the first V-cycle are carried out. Then in the next iteration through Step 5 of FMG algorithm the solution on the coarsest grid is transferred to the next to coarsest grid. Thereafter a V-cycle is carried out starting from the next to coarsest grid. The algorithm then proceeds with prolongations and successive V-cycles starting with progressively finer grids until a V-cycle is performed through all the grids whereupon the FMG algorithm is complete.

Multigrid is a remarkable integration of simple ideas and techniques: Gauss-Seidel relaxation, the residual equation, and coarse-to-fine and fine-to-coarse grid transfers. The result is a very powerful algorithm for solving differential equations like equations (4) and (10).

The application of the multigrid algorithm to achieve unweighted phase unwrapping or, in other words, to solve equation (4) will now be described.

A key idea of the multigrid algorithm is to store the partial derivatives $\Delta^x_{ij}$ and $\Delta^y_{ij}$ of the input phase data in separate arrays and to "correct" these derivatives at the grid boundaries after each restriction operation. The algorithm requires three arrays, with each array the same size as the input data array:

$\phi$—solution array $\Delta^x$—row derivatives $\Delta^y$—column derivatives

Each of these three arrays has its own pyramid of decreasing resolution grids like that shown in FIG. 4.

The boundary conditions require the partial derivatives $\Delta^x$ and $\Delta^y$ to satisfy the following relations:

$$\Delta^x_{0j} = -\Delta^x_{1j}, \quad \Delta^y_{i0} = -\Delta^y_{i1}. \tag{18}$$

This means that the first column of the array $\Delta^x$ is equal to the negative of its second column, and the first row of the array $\Delta^y$ is equal to the negative of its second row. These relations ensure the Gauss-Seidel relaxation will converge to the correct solution. The key idea of the multigrid implementation is to correct the residuals of the partial derivatives after each restriction operation so they satisfy equation (18). This ensures the Gauss-Seidel relaxations on the coarser grids converge to the correct solution.

The algorithm, denoted UFMG, is represented in Steps 1–7 below. For n UFMG cycles, the algorithm should be called n times. As usual, the subscript N denotes the dimensions of the current grid, and the restriction operation R and the prolongation operator P are defined to be the usual full weighting and bilinear interpolation operators. The expression $\phi_n \leftarrow \text{UFMG}(\phi_N, \Delta^x_N, \Delta^y_N)$ represents the UFMG algorithm. The partial differentiation operators $D^x$ and $D^y$ are defined by $$(D^x\phi)_{ij} = \phi_{ij} - \phi_{i-1,j}, \quad (D^y\phi)_{ij} = \phi_{ij} - \phi_{i,j-1}. \tag{19}$$

These operators are needed to compute the residuals in Step 2 of the algorithm.

1. If N×N is the coarsest grid, then go to Step 7.
2. $\Delta^x_{N/2} \leftarrow R(\Delta^x_N - D^x\phi_N), \quad \Delta^y_{N/2} \leftarrow R(\Delta^y_N - D^y\phi_N)$
3. Derivative correction step: set the first column of the array $\Delta^x_{N/2}$ equal to the negative of its second column, and set the first row of the array $\Delta^y_{N/2}$ equal to the negative of its second row.
4. $\phi_{N/2} \leftarrow 0$
5. $\phi_{N/2} \leftarrow \text{UFMG}(\phi_{N/2}, \Delta^x_{N/2}, \Delta^y_{N/2})$
6. $\phi_N \leftarrow \phi_N + P(\phi_{N/2})$
7. $\phi_N \leftarrow \text{UMV}(\phi_N, \Delta^x_N, \Delta^y_N)$ The V-cycle algorithm, which is called in Step 7, is defined as follows:

1. Relax 2 times on Eq. (7) with the given initial guess $\phi_N$.
2. If N×N is the coarsest grid, then go to Step 8.
3. $\Delta^x_{N/2} \leftarrow R(\Delta^x_N - D^x\phi_N), \quad \Delta^y_{N/2} \leftarrow R(\Delta^y_N - D^y\phi_N)$
4. Derivative correction step: set the first column of the array $\Delta^x_{N/2}$ equal to the negative of its second column, and set the first row of the array $\Delta^y_{N/2}$ equal to the negative of its second row.

5. $\phi_{N/2} \leftarrow 0$

6. $\phi_{N/2} \leftarrow \text{UMV}(\phi_{N/2}, \Delta^x_{N/2}, \Delta^y_{N/2})$ 7. $\phi_N \leftarrow \phi_N + P(\phi_{N/2})$ 8. Relax 2 times on Equation (7) with the initial guess $\phi_N$.

Step 5 of the UFMG algorithm by calling for the UFMG algorithm sequentially on coarser grids after Step 4, causes Steps 1–4 to be performed in sequence on successively coarser grids until the coarsest grid is reached in Step 1 whereupon the program shifts to Step 7 to perform the V-cycle algorithm on the coarsest grid. However, since the V-cycle algorithm is performed on the coarsest grid in the first iteration of Step 2 of the V-cycle algorithm, the program jumps to Step 8 on the first iteration of Step 2 of the V-cycle algorithm. Following completion of Step 8 on the coarsest grid, the program will proceed to Steps 6 and 7 in the UFMG algorithm on the next coarsest grid and then Steps 6 and 7 will be repeated on successively finer grids until the finest grid is reached. Upon completion of the V-cycle algorithm on the finest grid, the program will be completed. In this manner, the UFMG algorithm is caused to cycle through the grids in the pattern shown in FIG. 5b.

The application of the multigrid algorithm for weighted phase unwrapping or, in other words, for the solution of equation (10) will now be described.

The most challenging problem that must be solved in this case is the problem of correctly restricting the weighting values to the coarser grids. After describing the algorithm, the description will focus on the method for restricting the weights.

Like the unweighted algorithm, the weighted multigrid algorithm stores the partial derivatives $\Delta^x_{ij}$ and $\Delta^y_{ij}$ of the input phase data in separate arrays and corrects these derivatives at the grid boundaries after each restriction operation. The algorithm requires four arrays, where each array is the same size as the input phase data array:

$\phi$—solution array $\Delta^x$—row derivatives $\Delta^y$—column derivatives w—array of weights Each of these three arrays has its own pyramid of decreasing resolution grids as shown in FIG. 4. The algorithm is nearly identical to the unweighted algorithm described above. There are four differences:

The Gauss-Seidel relaxation must be performed on the weighted equation (12) instead of the unweighted equation (7).

The restriction of the partial derivative residuals to the coarse grids must be weighted.

The arrays of weighting values must be restricted to the coarser grids by means of a carefully defined restriction operator.

In one method of restricting weights described below the coarsest grid is chosen to be a 25×25 grid, instead of a one-point grid. On this grid, 100 relaxations are performed instead of the usual two relaxations. In a second method of restricting the weights described below, this difference is unnecessary. In the second embodiment, the coarsest grid is a 3×3 grid, as in the unweighted algorithm.

In the first described method of restricting weights, the coarsest grid size is defined to be 25×25 to preserve as much of the structure of the zero-weights (i.e., the weighting values of zero) in the given weighting array as possible. For problems in which there are a large number of zero-weights with fine structural detail, relaxation sweeps on smaller grids are often wasted. The 25×25 grid size is small enough that the 100 extra relaxation sweeps add only about 10% to the computation time.

The WFMG algorithm, represented by the expression $\phi_N \leftarrow \text{WFMG}(\phi_N, \Delta^x_N, \Delta^y_N, w_N)$, is carried out by the following Steps 1 through 8.

1. If N×N is the coarsest grid, then go to Step 8.

2. $\Delta^x_{N/2} \leftarrow R_w(\Delta^x_N - D^x \phi_N)$, $\Delta^y_{N/2} \leftarrow R_w(\Delta^y_N - D^y \phi_N)$ 3. Derivative correction step: set the first column of the array $\Delta^x_{N/2}$ equal to the negative of its second column, and set the first row of the array $\Delta^y_{N/2}$ equal to the negative of its second row.

4. $w_{N/2} \leftarrow \Re(w_N)$ (weight restriction operator)

5. $\phi_{N/2} \leftarrow 0$

6. $\phi_{N/2} \leftarrow \text{WFMG}(\phi_{N/2}, \Delta^x_{N/2}, w_{N/2})$

7. $\phi_N \leftarrow \phi_N + P(\phi_{N/2})$

8. $\phi_N \leftarrow \text{WMV}(\phi_N, \Delta^x_N, \Delta^y_N, w_N)$

The restriction operator $R_w$ in Step 2 weights the fine-grid values in accordance with $w_N$ before applying the full weighting operator (and dividing by an appropriate term to normalize the weighting values to be in the range of 0 to 1) to produce the new coarse-grid values. Step 8 sets forth expression for the V-cycle algorithm for weighted phase unwrapping and is carried out by the following steps.

1. If N×N is the coarsest grid, then relax 100 times on Eq. (12) with the given initial guess $\phi_N$, and then go Step 9.

2. Relax 2 times on Eq. (12) with the given initial guess $\phi_N$.

3. $\Delta^x_{N/2} \leftarrow R_w(\Delta^2_N - D^x \phi_N)$, $\Delta^y_{N/2} \leftarrow R_w(\Delta^y_N - D^y \phi_N)$ 4. Derivative correction step: set the first column of the array $\Delta^x_{N/2}$ equal to the negative of its second column, and set the first row of the array $\Delta^y_{N/2}$ equal to the negative of its second row.

5. $w_{N/2} \leftarrow \Re(w_N)$ (weight restriction operator)

6. $\phi_{N/2} \leftarrow 0$

7. $\phi_{N/2} \leftarrow \text{WMV}(\phi_{N/2}, \Delta^x_{N/2}, w_{N/2})$

8. $\phi_N \leftarrow \phi_N + P(\phi_{N/2})$

9. Relax 2 times on Eq. (12) with the initial guess $\phi_N$.

The weight restriction operator $\Re$, which is applied in Step 4 of the WFMG algorithm and Step 5 of the WMV algorithm, restricts the weighting values to the coarser grid. Since the weighting values never change after restriction, the restriction operation needs to be performed only once for each grid size.

The definition of the weight restriction operator $\Re$ will now be described. One possible definition of this operator is the full weighting operator defined by Eq. (15). However, the full weighting operator has the undesirable property of not always restricting zero-weights to zero-weights. For example, due to the smoothing effect of this operator, a single column of zero weights would be restricted to non-zero values as shown in FIG. 6. This would be undesirable if the zero-weights were meant to separate two independent regions of phase. Thus, one desirable property of the weight restriction operator is that it be "line preserving."

A second desirable property of the weight restriction operator is that it be "area preserving." It should preserve the relative areas of regions of zero-weights on the coarser grids. In particular, this property insures that scattered zero-weights, which may be caused by noise, do not propagate to zero weights that dominate the coarser grids.

These two properties of line- and area-preservation are satisfied by the following definition of the weight restriction operator:

Define the weighting value $w_{ij}$ of the coarse grid to be 0 if at least two of the four weights of the fine grid $w_{2i,2j}$, $w_{2i+1,2j}$, $w_{2i,2j+1}$, and $w_{2i+1,2j+1}$ are zero.

Otherwise, define $w_{ij}$ by the full weighting operator defined by Eq. (14).

Figure 7A:
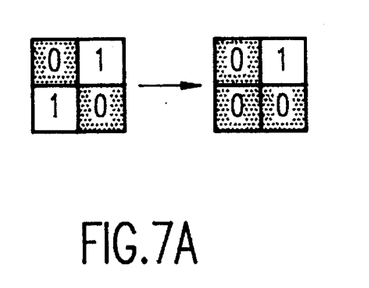
FIGS. 7a and 7b illustrate a first method of defining the weight restriction operation used in the system of the present invention.
Figure 7B:
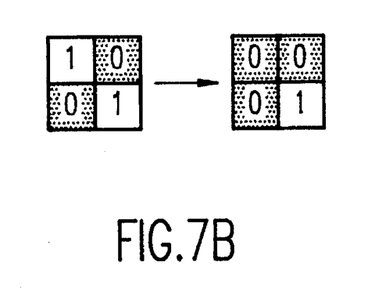

The weight restriction operator must include a preprocessing step which is a morphological "thickening" operation that thickens diagonal lines of zero-weights. This thickening step is carried out on weighting values in fine grid before using them to determine weighting values on the coarse grid. The thickening step is as follows:

If two zero-weights are diagonal to one another, then set the weight in one of the "corners" to zero, as shown in FIGS. 7a and 7b.

Figure 8A:
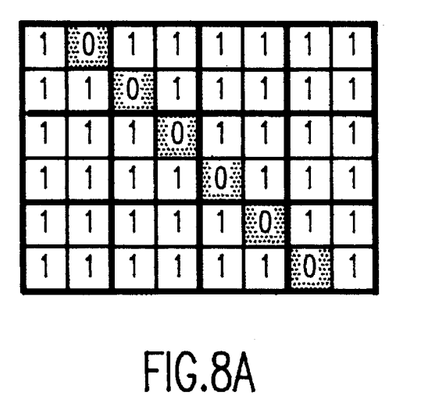
FIGS. 8a and 8b illustrate the need for thickening diagonal lines zeros when defining the weight restriction operation in accordance with the first method.
Figure 8B:
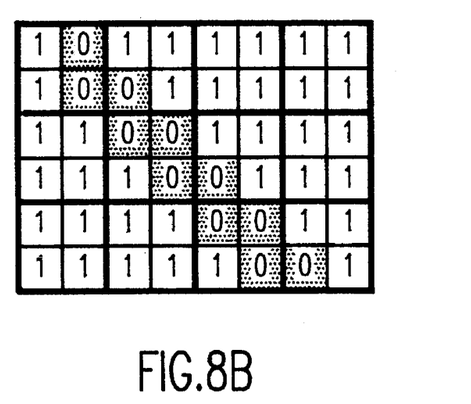

If the thickening step is omitted, then the weight restriction operator will not preserve the diagonal line of zero-weights shown in FIG. 8a. FIG. 8b shows the result of the weight restriction operator on this diagonal line.

Without the thickening step, the diagonal line of zero-weights on the fine grid shown in FIG. 7a would not be preserved by the weight restriction operator. The thickening step produces the zero-weights shown in FIG. 7b, which will be preserved as a diagonal line of zero-weights on the coarser grid.

As described above, the weighting values $w_N$ are transferred to coarser grids using a weight restriction operator $\Re$, which has a rather contrived definition and can be improved to have more natural definition.

The key idea of the improved method is to store two separate arrays of weights on two grid arrays: one for the d/dx partial derivatives and the other for the d/dy partial derivatives. Since only binary values (i.e., 0 and 1) are used for the initial weights, this second array does not add appreciably to the overall memory requirements. To distinguish this method of transferring the weights from the first described method, this method is referred to as the two array method and the weight restriction operator is referred to as the two array weight restriction operator.

The weighting arrays are represented by $\sigma$ and $\tau$ and are called the "d/dx weights" and the "d/dy weights," respectively. The initial values of these weights will be defined to be the input weighting values. Their values on the coarser grids will differ due to the definition of the weight restriction operator, which is denoted $\Re$ and defined later below. The weighting coefficients in Eq. (12) must be defined as follows:

$$w^x_{ij}=\min(\sigma_{ij}^2, \sigma_{i-1,j}^2), \quad w^y_{ij}=\min(\tau_{ij}^2, \tau_{i,j-1}^2), \quad (20)$$

where $\sigma_{ij}$ and $\tau_{ij}$ are the weighting values for the d/dx and d/dy partial derivatives, respectively. The restriction operator (denoted $R_w$) for restricting the residuals of the derivatives to the coarset grids must weight the fine-grid values before applying the full weighting operator (and dividing by an appropriate term to normalize the weighting values) to produce the new coarse-grid values. For restricting the d/dx residual derivatives, $R_w$ smooths the fine-grid values by the weighted version of the filter template (15)

$$\begin{bmatrix} \frac{1}{16}\sigma_{i-1,j-1} & \frac{1}{8}\sigma_{i,j-1} & \frac{1}{16}\sigma_{i+1,j-1} \\ \frac{1}{8}\sigma_{i-1,j} & \frac{1}{4}\sigma_{i,j} & \frac{1}{8}\sigma_{i+1,j} \\ \frac{1}{16}\sigma_{i-1,j+1} & \frac{1}{8}\sigma_{i,j+1} & \frac{1}{16}\sigma_{i+1,j+1} \end{bmatrix} \Big/ \sum_{a=-1}^{1}\sum_{b=-1}^{1}\sigma_{i+a,j+b} \quad (21)$$

and then resamples every other point. (If the weights are all zero, the unweighted filter template (15) is used instead).

The d/dy residual derivatives are restricted to the coarser grids by means of the same filter template with the d/dy weights $\tau$ in place of the d/dx weights $\sigma$.

On the finest grid, the two weighting arrays are defined by the input weights. On the coarser grids, the weights differ due to a different method of defining the weight restriction operators $\Re$ for each array. For d/dx weights, the weighting value $\sigma_{ij}$ is restricted as follows on the coarse grid.

Define the weighting value $\sigma_{ij}$ of the coarse grid to be 0 if at least one of the following three conditions hold:

(1) the two fine-grid weights $\sigma_{2i,2j}$ and $\sigma_{2i,2j+1}$ are 0;

(2) the two fine-grid weights $\sigma_{2i-1,2j}$ and $\sigma_{2i,2j+1}$ are 0 and the coarse-grid weight $\sigma_{i-1,j}$ is nonzero;

(3) the two fine-grid weights $\sigma_{2i,2j}$ and $\sigma_{2i-1,2j+1}$ are 0 and the coarse-grid weight $\sigma_{i-1,j}$ is nonzero;

Otherwise, define $\sigma_{ij}$ by the full weighting operator defined by Eq. (14).

For d/dy partials, the weighting value $\tau_{ij}$ is defined as follows on the coarse grid.

Define the weighting value $\tau_{ij}$ of the coarse grid to be 0 if at least one of the following three conditions hold:

(1) the two fine-grid weights $\tau_{2i,2j}$ and $\tau_{2i,2j+1}$ are 0;

(2) the two fine-grid weights $\tau_{2i-1,2j}$ and $\tau_{2i,2j+1}$ are 0 and the coarse-grid weight $\tau_{i-1,j}$ is nonzero;

(3) the two fine-grid weights $\tau_{2i,2j}$ and $\tau_{2i+1,2j-1}$ are 0 and the coarse-grid weight $\tau_{i-1,j}$ is nonzero;

Otherwise, define $\tau_{ij}$ by the full weighting operator defined by Eq. (14).

Figure 9A:
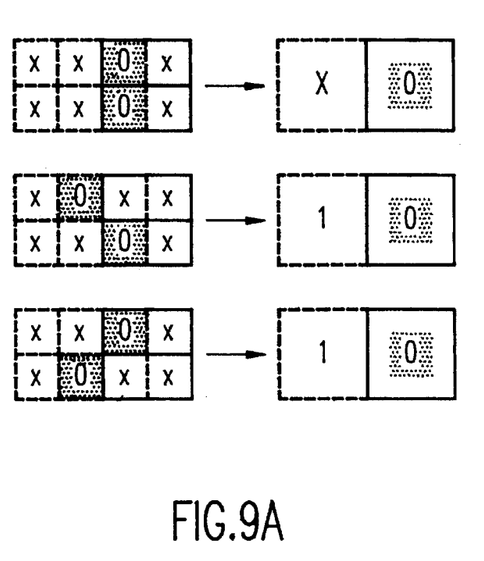
FIGS. 9a and 9b illustrate the operation of the weight restriction operation defined in accordance with a second method of defining the weight restriction operation.
Figure 9B:
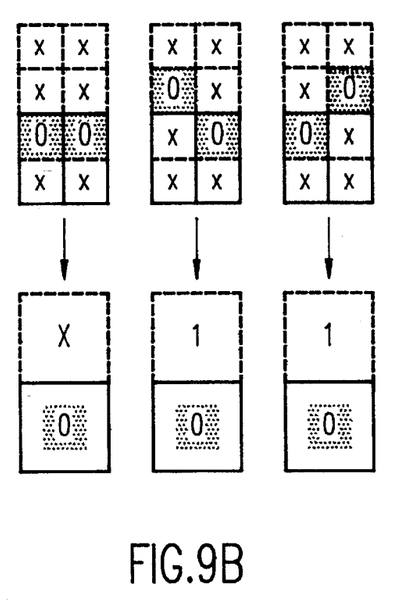

FIGS. 9a and 9b illustrate the operation of the d/dx weights and d/dy weights of the weight restriction operator in the two array method. In these Figures, "X" means that the corresponding value on the grid is irrelevant to the restriction process. In other words, the X's represent "don't care" values. This weight restriction operator is designed to minimize the number of zero weights while maintaining zero weights in the places where they are required. (For example, under conditions (2) and (3) of the d/dx weight restriction operator defined above, there is no need to set the weight $\sigma_{ij}$ to zero if the preceding weight $\sigma_{i-1,j}$ is already zero.) As a result, the unwrapping process is not impeded by the presence of unnecessary zero weights. There is also no need to choose the coarsest grid size to be 25×25 with 100 iterations on that grid since this weight restriction operation is effective at preserving the structural detail of the zero weights. The coarsest grid size is chosen to be 3×3, resulting in a much more robust and faster algorithm when the two array method of defining the weight restriction operation is used.

When the data of the sample has a relatively low level of noise, the two array method of transferring the weight values in the weighted multigrid algorithm does not substantially affect the convergence rate of the algorithm, that is, the convergence rate for both methods of transferring the weight values is substantially the same. However, when the data being operated on has a relatively high level of noise, the weighted multigrid algorithm employing the two array method has a convergence rate substantially faster than the convergence rate employing the first described method of transferring the weight values.

In the above-described weighted multigrid algorithms, the initial weighting values are empirically assigned on the basis of the knowledge that certain pixel values of the initial data are corrupt. Typically, the data known to be corrupt is given a weighting value of 0 and the other values of the pixel data which are not corrupt are assigned a weighting value of 1. Alternatively, a weighting value between 0 and 1 can be assigned based on a probability that certain portions of the data may be corrupt.

Instead of empirically assigning the weighting values based on the knowledge of which portions of the data are corrupt, the weighting values can be determined automatically by the data processor from the data itself.

In accordance with one method, the weights are defined based on the standard deviation of the phase partial derivatives. The means and the standard deviations of the d/dx and d/dy partial derivatives are computed in small (e.g., 5×5) windows, and the maximum deviation of each pair of values is selected. Each grid position has a 5×5 window centered thereon so that the windows overlap. The resulting selected values are then compared with a threshold to define the zero weights; every pixel having a value above the threshold is defined to have a weight 0 and the remaining values are defined to have a weight of 1.

The threshold is calculated as follows. The values are histogrammed and remapped and histogrammed again into about 10 bins in such a fashion that the first and the last bins each contain about 5% of the remapped values. The histogram, which tends to be U-shaped, is then examined. The value defining the bin at the minimum point of the histogram is selected to be the threshold. (If the histogram is W-shaped, the value defining the leftmost minima is selected.) If the histogram is not U-shaped (or W-shaped), the threshold is chosen so that a selected percentage (e.g., 20%) of the weights are zero.

The second method for defining the weights uses a well-known change detection technique. Two complex-valued SAR images (of the same scene) are co-registered and then a third complex-valued image is formed, where each pixel consists of the normalized cross-correlation coefficient of the two images in small (e.g., 5×5 or 9×9) windows. The resulting complex-valued pixels contain the temporal change information and the (filtered) phase fringes in the magnitude and phase parts, respectively. The magnitudes are then compared with a threshold selected by means of the histogram technique described above to create the weighting values.

Both methods of automatically defining the weights for the weighted multigrid algorithm work satisfactorily. However, the second method has been observed to be superior to the first method for actual interferometric SAR data.

The above described weighted multigrid method of unwrapping the pixel based phase difference data using the first single grid method of transferring the weights to the coarser grids is up to ten times faster than the prior art preconditioned congregate gradient method of unwrapping such data. The preconditioned congregate gradient method prior to the present invention was the only practical method of performing weighted least squares phase unwrapping. When the two array method of transferring the weights to coarser grids is employed in the weighted multigrid algorithm to perform the least squares unwrapping, the convergence is up to 25 times faster than the preconditioned congregate gradient method.

In the above-described method, Gauss-Seidel relaxation is employed to solve the least squares differential equation in the multigrid algorithm. Other relaxation schemes, such as the Jacobi relaxation method, may be used in place of the Gauss-Seidel relaxation method. The use of these relaxation schemes in multigrid algorithms is described in *A Multigrid Tutorial* by William L. Briggs, published by the Society for Industrial and Applied Mathematics, 360 University City Square Center, Philadelphia, Penn.

The above described invention is of preferred embodiments of the invention and other modifications may be made thereto without departing from the spirit and scope of the invention, which is defined in the appended claims.

I claim:

1. A method of generating a digital elevation model of a surface comprising transmitting radar pulses from a synthetic aperture radar system to be reflected from said surface, receiving radar pulses reflected from said surface at a first angle and a second angle slightly different than said first angle with said synthetic aperture radar system, performing the following steps with a data processor:

processing said received reflected radar pulses into a first set of data representing the phase of the received reflected pulses at said first angle from each increment of said surface and into a second set of data representing the phase of the reflected radar pulses at said second angle from each increment of said surface, determining a third set of data representing the difference in the phases between said first set of data and said second set of data for each of said increments, said third set of data representing the relative position of increments of said surface in modulo form, unwrapping said third set of data into a fourth set of digital data representing the relative position of said surface increments in digital form, said unwrapping step comprising determining partial derivatives of said third set of data and representing said partial derivatives as a fifth set of data, defining a least squares equation representing said fourth set of data in terms of said fifth set of data and the partial derivatives of said fourth set of data, solving said equation by relaxation in a multigrid algorithm which converges to said fourth set of data.

2. A method as recited in claim 1, wherein said multigrid algorithm comprises defining a multiplicity of grids decreasing progressively from grids of finest resolution to grids of coarsest resolution, initially representing said fourth set of data on said grids of finest resolution, transferring the problem represented by said equation successively to coarser grids by means of a restriction operator, performing relaxation on said coarser grids to determine interim solutions on said coarser grids, and transferring the interim solutions determined on said coarser grids successively to finer grids by means of a prolongation operator to converge to said fourth set of data on said finest grid.

3. A method as recited in claim 1, further comprising generating an image of said surface represented by said fourth set of data.

4. A method as recited in claim 1, wherein the terms of said equation are weighted to take into account the reliability of said third set of data in representing the relative position of increments of said surface.

5. A method as recited in claim 4, wherein the terms of said equation are weighted in accordance with weighting values separately determined for each grid point of the finest grid of a pyramid of grids comprising successively coarser grids, said multigrid algorithm applying said weighting values to said successively coarser grids of said pyramid in accordance with a weight restriction operator, said weight restriction operator setting the weight value in the next coarser grid to be zero depending on the zero and nonzero status of neighboring grid positions of the preceding finer grid in said pyramid.

6. A method as recited in claim 1 wherein said third set of data is represented on a grid having an x and y axes and wherein said partial derivatives include d/dx partials and d/dy partials, wherein said d/dx partials in said equation are weighted by a first set of weighting coefficients derived from a first set of weighting values and wherein said d/dy partials in said equation are weighted by a second set of weighting coefficients derived from a second set of weighting values and wherein said multigrid algorithm restricts said first and second weighting values to coarser grids on separate grid arrays in accordance with a weight restriction operator, whereby corresponding weighting values can have different values on said separate grid arrays.

7. A method as recited in claim 6 wherein the weighting values on a given grid are represented by $\sigma_{ij}$ and $\tau_{ij}$ and wherein $\sigma_{ij}$ represents the weighting values in the ith column and the jth row for the d/dx partials and wherein $\tau_{ij}$ represents the weighting values in the ith column and the jth row for the d/dy partials and wherein the weighting value $\sigma_{ij}$ on a given coarse grid is set to be zero by said weight restriction operator if at least one of the following conditions hold: (1) the two weighting values on the next adjacent finer grid $\sigma_{2i,2j}$ and $\sigma_{2i,2j+1}$ are zero, (2) the weighting values on the next adjacent finer grid $\sigma_{2i-1,2j}$ a and $\sigma_{2i,2j+1}$ are zero and the weighting value on such given coarse grid $\sigma_{i-1,j}$ is nonzero, or (3) the weighting value on the next adjacent finer grid $\sigma_{2i,2j}$ and $\sigma_{2i-1,2j+1}$ are zero and the weighting value on such given coarse grid $\sigma_{i-1,j}$ is nonzero and wherein said weight restriction operator sets the weighting value $\tau_{ij}$ on a given coarse grid to be zero if at least one of the following three conditions hold: (1) the two weighting values on the next adjacent finer grid $\tau_{2i,2j}$ and $\tau_{2i,2j+1}$ are zero, (2) the two weighting values on the next adjacent finer grid $\tau_{2i-1,2j}$ and $\tau_{2i,2j+1}$ are zero and the weighting value on such given coarse grid $\tau_{i-1,j}$ is nonzero, or (3) the weighting value on the next adjacent finer grid $\tau_{2i,2j}$ and $\tau_{2i-1,2j+1}$ are zero and the weighting value on such given coarse grid $\tau_{i-1,j}$ is nonzero.

8. A method as recited in claim 2 wherein said prolongation operator determines the values for a coarser grid by means of a prolongation operator value and adds the determined values to corresponding values on the next finer grid.

9. A method as recited in claim 8 wherein said prolongation operator is defined in accordance with the following equation:

$$f_{2i,2j} = c_{ij}$$

$$f_{2i+1,2j} = \frac{1}{2}(c_{ij} + c_{i+1,j})$$

$$f_{2i,2j+1} = \frac{1}{2}(c_{ij} + c_{i,j+1})$$

$$f_{2i+1,2j+1} = \frac{1}{4}(c_{ij} \; c_{i+1,j} + c_{i,j+1} + c_{i+1,j+1})$$

wherein $c_{ij}$ is a point on a grid in the ith column and the jth row and $f_{2i,2j}$ is the corresponding point on the next finer grid in the 2ith column and 2jth row.

10. A method as recited in claim 2 wherein said restriction operator multiplies neighboring values by selected constants and adds the resulting products together to set a corresponding value on the next coarser grid.

11. A method as recited in claim 10 wherein each point on a coarse grid is set in accordance with the following equation:

$$c_{ij} = \frac{1}{16}(f_{2i-1,2j-1} + f_{2i+1,2j-1} + f_{2i-1,2j+1} + f_{2i+1,2j+1}) + \frac{1}{8}(f_{2i,2j-1} + f_{2i,2j+1} + f_{2i-1,2j} + f_{2i+1,2j}) + \frac{1}{4}f_{2i,2j}.$$

wherein $c_{ij}$ is a point on a grid in the ith column and the jth row and $f_{2i,2j}$ is the corresponding point in the next finer grid in the 2ith column and the 2jth row.

12. A method as recited in claim 2 wherein after data representing partial derivatives are stored on a given grid, the first column of said given grid is set to equal the negative of the second column of said given grid and the first row of said given grid is set to equal the negative of the second row of said given grid.

13. A method as recited in claim 1 wherein said relaxation comprises Gauss-Seidel relaxation.

\* \* \* \* \*